Patented May 19, 1942

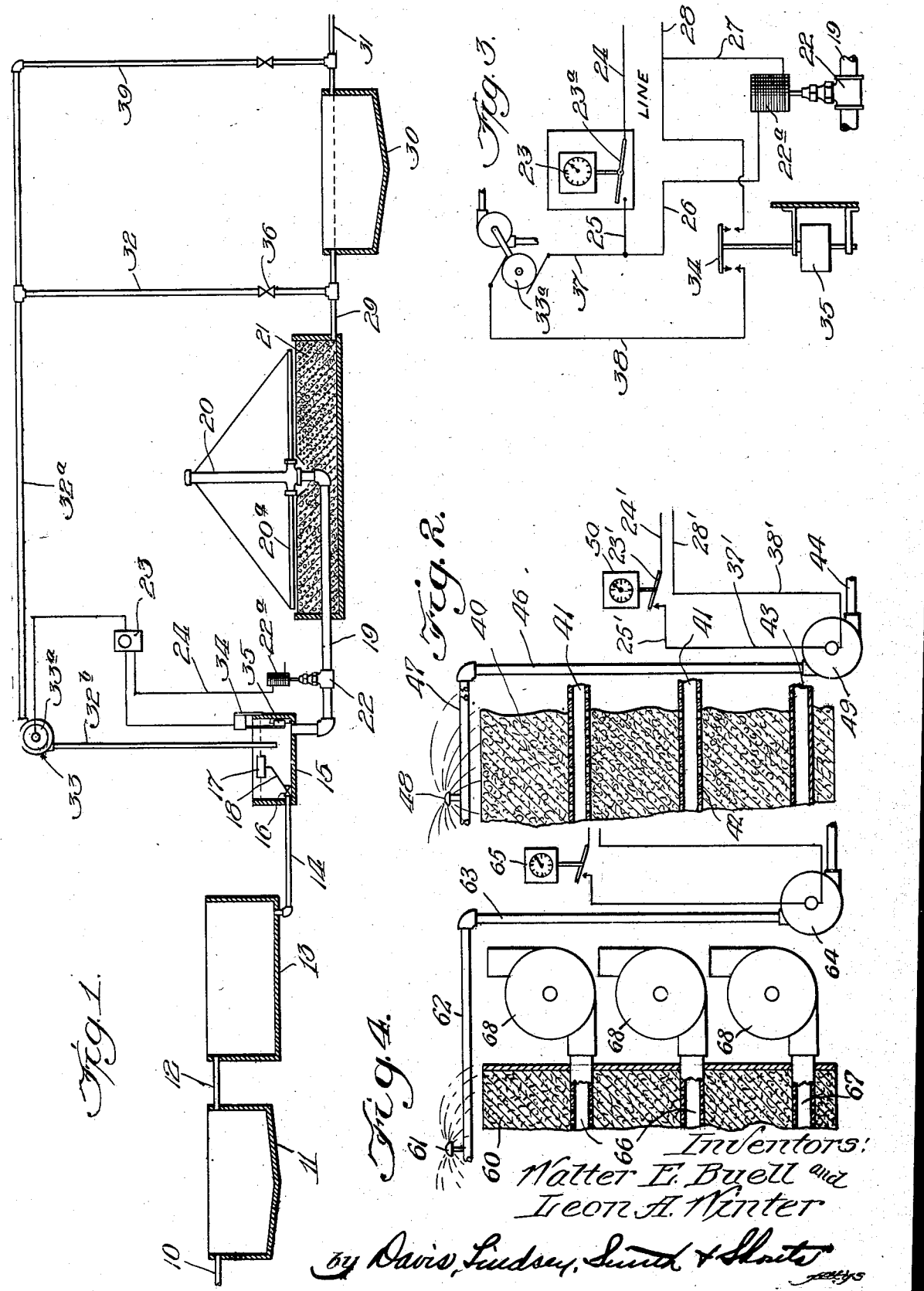

2,283,166

UNITED STATES PATENT OFFICE 2,283,166

METHOD OF TREATING SEWAGE MATERIAL

Walter E. Buell and Leon A. Winter, Sioux City, Iowa

Application June 23, 1937, Serial No. 149,880

2 Claims. (Cl. 210—7)

Our invention relates generally to filtration treatment of sewage or other waste material, and it has to do particularly with a method and apparatus for treating such material by subjecting it to the mechanical and biological actions of a trickling filter. It is to be understood that the term "sewage" wherever used herein is intended to include ordinary domestic sewage and all other waste materials that require filtering treatment similar to ordinary sewage for final disposal.

In order that our invention may be better understood, we will refer briefly to the characteristics of a trickling filter. Such a filter generally consists of a bed of coarse material, such as gravel or crushed stone, with which there is associated some means for applying the material to be filtered uniformly over the entire surface of the filter bed. This application means may take the form of the usual stationary spray devices or various known kinds of rotary or traveling distributor devices. In the use of such a filter bed, a gelatinous film forms upon the surface of the filter media, which film supports a comparatively heavy growth of active bacterial and plant life which acts upon the sewage in such a manner as to change the form of the dissolved solids and a certain portion of the suspended solids from an objectionable organic material into a more suitable form, whereby the effluent from the filter is caused to assume a stable condition substantially free from polluting influence. Such a filter bed functions both mechanically and biologically to condition or purify the material passing therethrough for final disposal.

The efficiency of the mechanical operation of the filter may be determined by the quantity of suspended solids strained out, so to speak, and the biological efficiency may be determined by the quantity of B. O. D. (five-day biochemical oxygen demand) removed by the filter. The biological efficiency of the filter depends upon the condition of the bacterial and plant organisms in the bed, which organisms feed upon the organic material in the sewage. These organisms demand a certain amount of oxygen for their existence, and the requisite amount of oxygen must be supplied in order that they may be properly conditioned to perform their intended functions. Oxygen may be supplied by causing the sewage material to be applied or dosed to the filter bed in such a way as to provide rest periods during which the flow of the sewage material to the bed is cut off.

Heretofore, according to the usual practice, the material to be treated has been received at the treatment plant under variable flow conditions, dependent entirely upon a varying flow from the source, such as a sewer. Such sewage material has been fed to the filter bed, after primary or other treatment, in such a way that the rate of flow thereto has been of a variable character and the intervals at which the rest periods occur, as well as the duration of such rest periods, have been variable, dependent upon variation in flow of the material from its source to the plant that is, the dosing cycle has varied with variation in flow of the sewage from its source to the plant. These conditions have created many disadvantages, including the wasteful necessity of providing and maintaining large and expensive filter areas, as well as loss in filtering efficiency.

One of the objects of our invention is to provide an improved method of filtering sewage or other waste material, and by which the disadvantages existent in prior practices are eliminated.

Another object of our invention is to provide a novel manner of handling the feed of sewage material to a trickling filter, wherein the feed of the material to the filter is not affected by variation in flow of the sewage from its source and wherein the material is applied or dosed to the filter at a constantly uniform rate of application, which application is carried on continuously except for interposed periods of rest at predetermined intervals and of predetermined duration.

Still another object is to provide an arrangement by which the rate of application of the sewage material to the filter and the liquid and organic loading of the filter may be materially increased with increased filtering efficiency from both mechanical and biological standpoints.

An additional object is to provide a filter treatment for sewage material whereby the sewage handling capacity of any given filter area may be increased without increase in size of the filtering area and equipment or any given capacity may be attained by a reduced filter area, all to the end that the cost of any given installation may be reduced by reducing both construction and operating costs.

Further objects are to provide an improved manner of sewage treatment by which the fly nuisance is eliminated; to provide an improved manner of reoxidation of the filter bed, including the interposing of short rest periods during which the filter bed is drained and air is supplied to the voids formed therein; to provide for an improved biological action in the filter, thereby insuring an improved effluent; to provide a filtering arrangement wherein the size of the filter bed may be definitely proportioned to the rate of application of the sewage thereto; and to provide a sewage treatment of such nature that the effluent finally discharged is of such character that it is substantially free from materials which will cause pollution and so that it is in condition for permissible final discharge.

In practicing our invention, the sewage material is received at the treatment plant at a rate dependent upon the rate of flow of such material from its source. At the treatment plant such material is subject to primary treatment, if it is of such a nature as to require that, and it is finally fed to a filtering zone in which it is subjected to the action of a trickling filter. The flow of such material from its source may be of the usual variable nature but, in following our improved method, the flow to the filter zone is controlled in such a way that the material is applied or dosed to such zone at a uniform rate of application during all periods of feed. We have found that the filter bed or zone will best perform its functions if the material is applied thereto at a comparatively high and uniform rate of application and continuously except for short periods of rest interposed at sufficiently frequent intervals and for periods of sufficient duration to accomplish the necessary reoxidation of the filter bed. We provide for that condition by interrupting (or entirely cutting off) the otherwise continuous, uniform, high-rate feed of material at predetermined times to provide rest periods of sufficient duration to enable the material to drain substantially entirely from the filter bed and to permit the voids formed within the bed to fill with air, after which the same flow at the same uniform rate of application as previously is resumed. We have also found that, in the treatment of certain domestic sewage, for example, excellent results may be obtained by dosing the filter in a controlled, uniform manner at a rate in excess of 7,000,000 gallons per acre per day and by providing a total rest period of approximately four minutes during each hour, the rest periods being controlled to occur every thirty minutes for a period of approximately two minutes. The interval of feed between rest periods, as well as the duration of the rest periods, may be varied, dependent upon the liquid load or organic load imposed upon the filter as determined by local conditions and by the character of the material being treated. In any event, though, for any particular loading (liquid or organic) and any particular material we, preferably, employ rest periods of uniform duration occurring at predetermined, and preferably uniform, intervals.

More particularly, in carrying out our invention, and to the foregoing end, we may provide a control zone in which there is maintained a predetermined head of material, and from which such material is fed or dosed to the filter zone. The feeding or dosing of the material from the control zone to the filter zone is controlled, independently of the character of the material and the flow of the same, by suitable timing mechanism which positively interrupts the flow of the material from the control zone at predetermined times for a predetermined length of time. In other words, this mechanism controls the time of beginning and ending of the rest period, the duration of which is dependent upon the time required for the material previously flowed to the filter bed to drain therefrom, which condition, for any particular material being handled, may be determined by observing the discharge of material from the outlet of the filter zone.

In providing a predetermined head condition in the control zone, a problem exists with respect to the disposition and handling of excess material during, for example, maximum or peak flow periods; with respect to insufficiency in flow to maintain the head in the control zone during low or minimum flow conditions; and with respect to the disposition of material which continues to flow from the source during the rest period. We take care of these conditions by employing a storage zone in which excess material to be filtered is stored during the high peak flow periods (or periods during which the material flowed is in excess of that required to maintain the predetermined head in the control zone) and during the rest periods above mentioned. The storage and control zones may be so related that the storage zone feeds directly to the control zone and such feed is interrupted when the head in the control zone reaches its predetermined condition. By so relating the storage and control zones, uniformity in flow from the control zone under a predetermined head condition is not affected by variation in flow to the storage zone; wherefore, during rest periods and during periods when the material flowed is in excess of that required to maintain the head in the control zone, material builds up in the storage zone sufficient to maintain the predetermined head condition in the control zone during the minimum flow period or during those periods when the flow of the material is insufficient to maintain the predetermined head in the control zone.

Continuous feeding to or dosing of the filter zone, except for the short periods of rest required for reoxidation purposes, and feeding or dosing at a uniform rate of application, insure an increase in the efficiency of the filter media. Also, by so controlling the flow or dosing action, high rates of application or dosing may be employed over longer periods of time than have heretofore been possible, thereby greatly increasing the capacity of the filter without affecting its efficiency and intended functioning, with the result that the same amount of sewage handled under usual practice by large filter areas may be handled, in practicing this invention, by filter areas only a fraction of that previously employed, and with increased efficiency. In order that these results may be accomplished under certain conditions of flow, that is, in order that the flow to the filter zone may be maintained at a uniform and high rate of application, we may further include, as an additional step in our method, the return of the effluent from the filter zone to either the storage or control zone during the periods of feed in order to maintain a predetermined head and flow condition from the control zone to the filter zone. The return of the filter zone effluent is for only uniformity in flow maintenance purpose, and it is directly subject to the flow control of the control zone, whereby the rest periods that we definitely impose under the conditions above stated are not in any way affected by the effluent's return, which takes place only during periods of feed.

It will be seen from the foregoing that the purpose of the control zone is to accomplish a predetermined rate of application to the filter zone throughout the time that the material is fed or dosed to the filter zone; and that the storage zone, together with the effluent return or otherwise, insures an adequate supply of material to effect such flow at all times. Therefore, the control zone may, structurally speaking, take the form of a shallow reservoir with the necessary head maintaining mechanism, or it may take the form of a pump or the like device which operates to feed continuously, during all periods of feed, a uniform amount of material from the storage zone to the filter zone. In the use of a reservoir of the foregoing character, suitable valve mechanism may be actuated under the control of the time-control mechanism to stop and start the flow of material to the filter zone to begin and end the rest periods; and in the use of a pump, the time-control mechanism may start and stop the pump to provide the rest periods.

In treating certain materials such as, for example, certain domestic sewage, it may be necessary to first subject the same to so-called primary treatment, in which it is passed through a settling zone before it is fed to the storage zone. Also, in certain instances, it may be found desirable to pass the effluent from the filter zone into a settling or clarifying zone before passing such effluent to the point of final disposal. Independently of these features, however, our invention and discovery essentially involve controlled flow or dosing of the filter zone at a substantially uniform rate of application, and at high rates of application as rated for the particular sewage or waste material treated over long periods of time, which application is continuous except for the interposing of definite, independently controlled periods of rest of uniform duration determined by the organic characteristics of the sewage or waste material to permit the filter bed to become properly aerated.

Various structural arrangements may be employed in practicing our invention, some of which, for example, are illustrated in the drawing wherein, Figure 1 is a diagrammatic view showing one form of sewage system embodying our invention;

Fig. 2 is another, and somewhat diagrammatic, view showing another form of structure that may be used in practicing our invention;

Fig. 3 is a wiring diagram illustrating one manner of electrically controlling the flow of material according to our invention;

Fig. 4 is a view diagrammatically illustrating another form of structure that may be used in practicing our invention.

Referring particularly to Fig. 1, the sewage to be treated may be taken directly from a sewer or any other source, and it is eventually flowed through a conduit 10 to a settling or clarifying tank 11 at whatever rate it is received from its source. It is to be understood that the settling tank 11 may be dispensed with, if it is not required for the particular material treated, without departing from our invention. The effluent from the settling tank 11 is flowed in an uncontrolled manner through a conduit 12 to a storage reservoir 13 of sufficient capacity to store and handle any excess material flowed thereto during high peak flow periods and rest periods, which will be referred to further hereinafter. The storage reservoir 13 is directly connected through a conduit 14 to a so-called control tank or reservoir 15 which is of comparatively small dimensions and of a shallow nature so as to provide a control that is sensitive to comparatively slight variations in level of material therein. The flow of material from the storage reservoir 13 to the control reservoir 15 is controlled by a valve 16 in conduit 14, which valve is opened and closed by a float 17 as the head or level of the material in the tank 15 varies between certain limits. More particularly, the valve 16 is connected to the float 17 by connections 18 of such a nature that, when the desired head or level of material is reached in the reservoir 15, the upward movement of the float 17 to that position will close the valve 16; and, when the level of the material is below that point, the consequent lowering of the float 17 will open the valve 16 and admit material from the reservoir 13 to restore the level of the material in the reservoir 15, at which time the valve 16 is again closed by the float 17. This cycle is repeated from time to time as variation in the level of the material in the reservoir 15 takes place.

The control reservoir 15 is connected by a suitable conduit 19 to a distributor mechanism 20 of the so-called rotary type, which has distributor arms 20a that rotate to discharge the material from the control reservoir 15 upon a trickling filter bed 21. Through the action of the rotary distributor arms 20a, the material is distributed in a substantially uniform manner throughout the entire filter bed during all periods of feed.

The flow of the material from the control reservoir 15 to the filter bed 21 is additionally controlled by suitable valve mechanism in such a way as to interrupt the flow and interpose definite periods of rest. Specifically, a valve 22 is located in conduit 19 between the reservoir 15 and the distributor 20. The valve 22 may be opened and closed by means actuated by a solenoid 22a, or opened and closed by a suitable motor or some other power driven means. In order that the periods of rest be interposed at predetermined times independently of the flow of the material to the filter bed, we may employ time clock mechanism 23 of any known form which is adapted to break an electrical circuit at certain predetermined times and for periods of predetermined duration. The time-clock mechanism 23 is, preferably, connected in series with the valve operating mechanism 22a so that, when the clock mechanism functions to break the circuit, the valve 22 is actuated to close the conduit 19 and immediately cut off the flow of material to the filter bed 21.

One form of electrical circuit that may be employed in controlling the structure just described is shown in Fig. 3. Specifically, the clock mechanism 23 includes a switch 23a which is closed during periods of feed, thereby closing an electric circuit through wire 24, switch 23a, wires 25 and 26, solenoid 22a or other suitable operating mechanism, and wires 27 and 28. During this time, the solenoid 22a or other suitable operating mechanism is energized and the valve 22 is held in its open position and the material flows through the conduit 19 to the distributor 20. The clock mechanism is constructed and arranged to open the switch 23a at a predetermined time and to hold such switch open for that time required for the particular material being treated to drain from the filter bed 21. When the switch 23a is opened, the solenoid 22a is de-energized, thereby closing valve 22 and beginning a definite period of rest which is continued until the clock mechanism functions to close switch 23a. This cycle is continued over and over again to establish definite, alternating, long periods of feed and short periods of rest. It is to be understood that the solenoid 22ª is referred to only by way of example. An electric motor or other electric operating mechanism suitable for opening and closing the valve 22 may be employed instead of a solenoid. In some instances the valve 22 may be hydraulically operated in which case the clock mechanism 23 will be of a character suited for hydraulic control of such mechanism.

During the period of flow to the filter bed 21, as determined by the clock mechanism 23, the material flows to the control reservoir 15 and thence, under a constant head, through the conduit 19 to the distributor mechanism 20. The float and valve mechanism 16, 17 is set to maintain a certain uniform flow and rate of application to the filter bed 21. If the flow to the reservoir 13, as during high peak flow periods, is such as to exceed that predetermined uniform flow and rate of application to the filter bed, the float 17 will close valve 16, the opening and closing cycle being carried out in such a way as to maintain only a predetermined flow condition within the reservoir 15 and to the filter bed. The float and valve connection 18 may be adjusted in any desired manner to cause the float 17 to cut off the flow to reservoir 15 at varying liquid levels therein to vary the rate of application of the material to the filter bed 21. When the flow is interrupted by the clock mechanism 23 and when the predetermined level is reached in the reservoir 15, the oncoming material will be stored in the reservoir 13. At the end of each rest period, which period should be long enough to permit the fluid to substantially entirely drain from the filter bed 21 and allow the voids in said filter bed to substantially fill with air, the clock mechanism 23 functions to again close the switch 23ª, thereby opening valve 22, as above described, and immediately starting the flow of material to the filter bed at the same predetermined and uniform rate that existed prior to the rest period. This cycle is completed over and over again, with the flow and rest periods alternating at predetermined times and for predetermined periods as determined by the character of the material and the liquid and organic loads which the filter is capable of handling.

The effluent from the filter, in the particular arrangement above described, is fed through a conduit 29 to a clarifying reservoir 30 and thence through a conduit 31 to the point of final disposal. In certain cases the flow characteristics of the material to be filtered may be such that the desired high rate of application cannot be maintained during all periods of feed, and in that event we provide for the return of the filter effluent, or a part thereof, to supplement the material being fed to the control reservoir 15. More particularly, the filter discharge conduit 29 may be connected by suitable conduits 32, 32ª and 32ᵇ to the control reservoir 15. Or, if desired, this connection may be directly to the storage reservoir 13 or to the flow connections leading to the control reservoir 15. A pump 33 is mounted between the conduits 32ª and 32ᵇ, and it is actuated by an electric motor 33ª electrically connected in series with the clock mechanism 23 (see wiring diagram of Fig. 3) so that it may operate only during periods of feed and when the clock switch 23ª is in position to close the electric circuit. The operating control of the pump 33 is further accomplished by a switch 34 adapted to be opened and closed by a float 35 located in the control reservoir 15. With this arrangement, lowering of the level of the material in the reservoir 15 to a predetermined extent (say, for example approximately 1 inch below the level maintained by the float 17), actuates the switch 34 to close the electric circuit through the clock mechanism 23 and pump 33 to start the pump in operation. A valve 36 is located in the conduit 32 so that the effluent return feature may be cut in or out as conditions may require. In the operation of the structure just described, assuming that the valve 36 is opened, if, during the period of feed, the material normally fed to the storage reservoir 13 should be insufficient to maintain the predetermined head or level of material in the reservoir 15 and, in turn, the predetermined uniform flow and rate of application to the filter bed 21, the float-controlled switch 34 will be closed by the lowering of the level of the material, thereby closing the electrical circuit through wire 24, switch 23ª, wires 25 and 37, pump motor 33ª, wire 38, switch 34 and wire 28, as shown in Fig. 3. When this circuit is closed, the pump 33 is operated to pump filter effluent back through the conduits 32, 32ª and 32ᵇ to the reservoir 15. The pump 33 will be cut out as soon as the desired level is restored in the reservoir 15, and this cycle will be repeated as often as the lowering of the material may cause the same to happen. When the clock mechanism 23 functions to interpose a period of rest, the electric circuit through the motor 33 is opened, regardless of the position of the switch 34, and no effluent is returned from the filter at that time, whereby the filter is permitted to drain in the manner already described. If, in the foregoing arrangement, a clarifying reservoir 30 is employed, it is to be understood that the filter effluent may be returned either before or after passing through such reservoir. We, preferably, provide a valved conduit 39 leading from conduit 31 to the conduit 32ª, to permit selective return of either the filter or clarifier effluent, as desired.

Another structural arrangement for carrying out our invention is shown in Fig. 2, which arrangement is shown and described in our copending application Serial No. 61,017, filed January 27, 1936, of which this application is a continuation-in-part. This structure is similar to that illustrated in Fig. 1 except that the application of the sewage material to the filter is controlled by a pump mechanism adapted to continuously deliver the material to the filter at a constant, uniform rate of application, and the material so delivered to the filter bed is discharged and distributed by stationary spray devices. It will be understood, however, that, if desired, rotary distributor mechanism like that shown in Fig. 1 may be substituted for the stationary spray devices with results of the character already set forth.

Specifically, the structure shown in Fig. 2 includes a filter bed 40 similar to the bed 21 (Fig. 1) except that it is provided internally with a plurality of horizontally disposed pipes or ducts 41 at various heights therein throughout the mass of the filter medium. These ducts may be made of any suitable material and they may take any desired shape in cross-section, the same being perforated at the top and bottom sides thereof, providing a multiplicity of openings 42 therein for admitting air to the filter bed. The ends of the air ducts 41 may be connected with the atmosphere in any suitable manner whereby air may freely enter therein without any of the material passing through the filter flowing therefrom. While these air ducts are arranged, preferably, for a natural flow of air therethrough under the influence of normal conditions—temperature, pressure or otherwise—existing both outside and within the filter bed, we may employ in certain cases mechanical means for forcing air into such ducts and into the voids formed in the filter bed by the draining of the sewage material therefrom, or otherwise. One such means is illustrated in Fig. 4, which will be referred to further hereinafter. At the bottom of the filter bed, there is a drain channel 43 and the upper side of this channel is provided with perforations 42 similar to those in the air ducts 41 for a similar purpose.

On the operation of the structure shown in Fig. 2, the material to be filtered may be fed from a storage reservoir corresponding to the reservoir 13 of Fig. 1 through suitable conduit 44 to a control mechanism and thence to the filter bed through conduits 46 and 47. The latter conduit extends over the upper surface of the filter bed and is provided with a plurality of stationary nozzles 48 which are adapted, during the flow period, to discharge onto the upper surface of the filter in a substantially uniform manner throughout the filter surface. The control mechanism may take any suitable form adapted to be cut in at predetermined times for feeding, for a predetermined period, the material continuously at a uniform rate of application to the nozzles 48 and the filter bed 40. Such mechanism may further include a time-control device which may be adjusted in such a way as to cut in and out the flow control portion of the mechanism at predetermined times so as to interpose definite rest periods, like those imposed in the form of Fig. 1, for the purpose already fully discussed. More particularly, the control mechanism includes an electric pump 49, such as the pump 33 of Fig. 1, which pumps a continuous, uniform amount of material for a storage reservoir to the filter so long as the electric circuit controlling its motor is closed. The time control mechanism may take the form of a time clock 50 similar to the clock 23 of Fig. 1, so disposed in the circuit in which the pump motor is located that at certain periods it functions to break that circuit and stop the pump 49 and interpose the rest period as in the form of Fig. 1. The electric circuit may include wiring 24', 25', 37', 38' and 28' and clock switch 23' corresponding to the wiring 24, 25, 37, 38 and 28 and switch 23ª of Fig. 1. Therefore, with structure of the foregoing character, the material to be filtered may be fed in a controlled manner; it may be fed at a uniform rate of application; the feed of the material to the filter may be stopped and started instantaneously; and the flow may be interrupted at any predetermined time and for any desired length of time to interpose the essential periods of rest. These periods of rest should be of the same duration as explained in describing the arrangement of Fig. 1.

The arrangement shown in Fig. 2 may be supplemented by effluent return mechanism similar to that shown in Fig. 1. The effluent from the filter may be returned to the storage reservoir or directly to the conduit 44 so as to supplement and maintain a sufficient supply therein and from which the pump 49 may draw for maintaining uniformity in rate of application. Other than just described, this form of our invention is similar to that of Fig. 1 and may well be utilized in carrying out our novel method of filtration.

Referring to the structure shown in Figure 4, it includes a filter bed 60 to which the sewage material is fed by means of spray nozzles 61, conduits 62, 63, electric pump 64, and electric time control mechanism 65, the control mechanism being similar to that shown in Fig. 3. The filter bed 60 is further provided with air pipes or ducts 66, 67 similar to the ducts 41, 43 of Fig. 2, except that air is forced thereinto by suitable means 68.

We believe that the operation and advantages of our invention will be readily understood from the foregoing. The organisms of the filter bed are maintained in their most efficient feeding condition. They are adequately supplied with the necessary amount of oxygen required for them to efficiently perform their purification function with high rates of application or high liquid and organic loadings over long periods of time. Also, the filter bed, by the continuous application at a uniform high rate over long periods of time, is kept in proper condition for performing its mechanical filtering functions. Clogging and pooling are avoided. The nearly continuous application of the sewage material will eliminate the fly nuisance due to the fact that the filter bed is kept wet in a nearly continuous manner, and the filter fly does not exist in such wetted filter areas. The sum total of the filtering results, both biologically and mechanically, are such that the efficiency of the filter is materially increased while, at the same time, the filtering capacity thereof is greatly increased. The liquid loadings of the filter, as well as the organic loadings thereof, may be increased far beyond the point of expectation of filter structures operating under prior practice. For example, by way of comparison with the usual loadings of the customary or prior filter systems adapted to handle approximately two million gallons per acre per day of the sewage material, the same having an applied strength of approximately 130 P. P. M. of B. O. D., or a normal loading capacity of 250 pounds per acre-foot per day, in practicing our invention such loadings may be increased at least seven or eight times and may reach as high as twenty to thirty, or higher, million gallons per acre per day of the material treated. In any event, while the liquid loadings may vary with organic loadings, our invention, for best results comparatively with the loading rate of two million gallons of liquid per acre per day, should be operated at a liquid loading in excess of seven million gallons per acre per day. Furthermore, in practicing our invention, through uniformity in rate of application with very short rest periods, the rate of application, notwithstanding variation in flow from the source, is smoothed or ironed out in such a way as to avoid variations in dosing which reduce total capacity handling of the filter structure.

We appreciate that the dosage rate or rate of application of the material to the filter bed is determined, in part at least, by the biological capacity of the filter medium; but, by using our invention, any particular filter structure may be biologically conditioned for handling its full capacity at all times with intended biological functioning. The rate of application, the duration of feed, the frequency of rest periods and the duration of the rest periods may be varied according to the organic loading of the material to be treated. Therefore, one may readily determine the length of the feed period and also the frequency and length of the rest periods from the characteristics of the material to be treated. For example, in normal operation, a filter operated according to our invention may function to the end of approximately 75 per cent B. O. D. removal, and when this percentage drops in efficiency from 5 to 10 per cent, indicating that the organisms need a fresh supply of oxygen, the rest period may be caused to occur for the predetermined time hereinbefore discussed.

It is well known that filter structures involve considerable expense, due to initial cost and also due to operation and maintenance costs. The area that must be occupied for such filters is considerable in order to handle the domestic sewage of a city of even comparatively small size. Our invention greatly relieves this condition. By stepping up the filtering capacity, the filtering area may be greatly reduced with increased filtering efficiency, thereby greatly reducing cost from all standpoints. For example, where, according to the customary practice, a filter bed of one acre size may be required to handle the sewage for a particular district, that area may be reduced to, say, from $\frac{1}{10}$ to $\frac{1}{4}$ of an acre and still more efficiently handle the same quantity of sewage.

It is to be understood that, while we have described different applications of our invention, other arrangements, embodying the fundamentals and essentials of our invention may be resorted to without departing from the spirit and scope of our invention as defined by the claims that follow.

We claim:

1. The method of treating sewage or other waste material which comprises the steps of: continually feeding the material to be treated to a trickling filter at a controlled, substantially uniform rate; periodically interrupting the feed to provide intervals of rest; and timing said periods of feed and rest respectively so that a definite feed period is followed by a definite rest period, the ratio of the period of rest to the period of feed (in minutes) being approximately 2 to 30 in any given half hour.

2. The method of treating sewage or other waste material which comprises the steps of: continually feeding the material to be treated to a trickling filter at a controlled, substantially uniform rate; periodically interrupting the feed to provide intervals of rest; and timing said periods of feed and rest respectively so that a definite feed period is followed by a definite rest period, the ratio of the period of rest to the period of feed (in minutes) being not less than 1 to 60 nor more than 6 to 60 in any given hour.

WALTER E. BUELL.
LEON A. WINTER.